United States Patent
Negro et al.

(10) Patent No.: US 8,542,930 B1
(45) Date of Patent: Sep. 24, 2013

(54) MARK READER CONFIGURED TO PRIORITIZE IMAGES

(75) Inventors: James A. Negro, Arlington, MA (US); John F. Keating, Medway, MA (US)

(73) Assignee: Cognex Corporation, Natick, MA (US)

( * ) Notice: Subject to any disclaimer, the term of this patent is extended or adjusted under 35 U.S.C. 154(b) by 330 days.

(21) Appl. No.: 12/982,007

(22) Filed: Dec. 30, 2010

(51) Int. Cl.
*G06K 9/36* (2006.01)
*G06K 7/00* (2006.01)
*G06K 7/10* (2006.01)

(52) U.S. Cl.
USPC .......... 382/190; 382/232; 382/312; 235/435; 235/462.01

(58) Field of Classification Search
USPC ................ 382/190, 232, 312; 235/462.25, 235/462.16, 470, 435, 462.01; 375/240.12, 375/E7.271, E7.088, E7.14, E7.209, E7.226, 375/7.232, E7.266; 348/14.15, E5.108, 466
See application file for complete search history.

(56) References Cited

U.S. PATENT DOCUMENTS

| | | | |
|---|---|---|---|
| 5,512,739 A | 4/1996 | Chandler et al. | |
| 7,121,469 B2 | 10/2006 | Dorai et al. | |
| 7,254,665 B2 | 8/2007 | Yee | |
| 7,331,523 B2 * | 2/2008 | Meier et al. | 235/462.25 |
| 7,466,868 B2 | 12/2008 | Wilensky | |
| 2007/0014542 A1 | 1/2007 | Poulsen | |
| 2010/0200660 A1 | 8/2010 | Moed et al. | |

\* cited by examiner

*Primary Examiner* — Sheela Chawan
(74) *Attorney, Agent, or Firm* — Quarles & Brady LLP

(57) ABSTRACT

Systems and methods for use with a mark reader that reduce the trigger-to-decode response time by prioritizing images to be decoded based on the likelihood of a successful decode are provided. A reader attempts to decode a priority image(s) first to avoid attempting to decode images that are less likely than other images to be successfully decoded. Images are rated based on feature attributes, and then prioritized for decoding. Image feature attributes are correlated with parameter groups, and the parameter groups are prioritized for use in subsequent image acquisitions.

20 Claims, 7 Drawing Sheets

MARK READER CONFIGURED TO PRIORITIZE IMAGES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the field of mark or symbology readers used to read marks (e.g., symbols, barcodes, text characters including alphanumeric, kanji, etc.) directly on objects, and more specifically to a reader that is configured to prioritize images for decoding to reduce the time for a successful decode.

Mark or symbology reading (also commonly termed barcode scanning) entails the aiming of an image acquisition sensor (e.g., CMOS camera, CCD, etc.) or vision system (e.g., VSOC) contained within the reader at a location on an object that contains a mark, and acquiring an image of the mark. Marks are known and available in a variety of shapes and sizes, and are designed to contain data, such as a set of predetermined patterns that represent an ordered group of characters or shapes. The reader, including an attached data processor (e.g., a microcomputer), can derive useful information from the data about the scanned object (e.g., its serial number, type, model, price, etc.).

Referring to FIG. 1, the image decoding process in known mark readers typically works in the following way. The image decoding process is initiated, such as by a trigger signal, as indicated at process block 50. At this point, the reader may or may not be pointing at the mark to be decoded. The reader then applies the first in possibly a selection of one or more parameter groups to an image acquisition system, as indicated at process block 52. Parameter groups include an arrangement of one or more parameter settings including exposure, gain, focus selection, illumination selection, and illumination control, for example. After the parameters for an image acquisition are applied, an illumination source on or within the reader is turned ON at process block 54 to illuminate the mark to be decoded. Illumination, either external or ambient illumination and/or illumination from the reader, reflects off of the intended mark and back to the reader and onto, i.e., to expose, an image acquisition sensor within the reader to acquire an image of the mark, as indicated at process block 56. Typically, the sensed image is transferred to memory (e.g., SDRAM), for storage, as indicated at process block 58.

If the reader is configured to acquire one or more additional images, as indicated at decision block 60, a new parameter group is applied to the acquisition system and the process repeats starting at process block 52. In some known variations, the reader is configured to acquire an image using a parameter group one time, or more than one time, or continuously.

Once an image has been stored to memory, a data processor selects the image from memory and executes a predetermined algorithm on the stored image data in an attempt to decode the image data, as indicated at process blocks 62 and 64. Typically, images are operated on in the same sequence as they are acquired and stored in memory, although some images may be discarded, for example.

Optionally, the reader is configured to perform some image filtering operations on the image prior to decoding, as indicated at decision block 66. This image filtering is performed by the processor, as indicated at process block 68, or it is performed by hardware prior to storing the image to memory. Filtering can be considered part of the decode processing itself, but when considered as a separate pre-processing step, it is designed to transform the image in a manner such that further decode processing is easier, (e.g., such as a contrast enhancement to enhance the mark features, or image smoothing to suppress background texture).

After the decoding step of process block 64, if the mark is found and successfully decoded, as indicated at decision block 70, the reader typically will transmit the decoded data from the mark by outputting the decoded data, and/or actuating some form of user feedback such as a beeper and/or status lights, and turn the illumination OFF, as indicated at process block 72. The process is then repeated upon activation of the next trigger event. If the decoding step does not result in a decoded image, the process typically returns to process block 62 to select another image from memory for decoding.

A primary weakness for both fixed mount readers and handheld readers is the large variation in overall trigger-to-decode times when a variety of marks are present. In one configuration, known systems are configured to cycle through one or more image capture parameter groups during the image acquisition process. In a second known configuration, the system begins the image acquisition process with a parameter group that corresponds to the last successful decode.

Both of these methods are not ideal when there are variations in the mark properties. For example, the first configuration may provide a more consistent decode time for similar mark types, however some marks will have a significantly longer decode than other types depending on the sequence of the previously determined parameter group. The second configuration optimizes for the last decoded mark type, but any variation of the marks attempted to be imaged and decoded will introduce inconsistent and longer decode times.

It is recognized that certain aspects of the mark to be read can make it difficult to detect or decode it within a limited number of images. In particular, certain codes that have low contrast (e.g., printing on a brown cardboard box) may require the imaging system to perform adjustments to system parameter settings, such as gain or exposure, during the acquisition process. In such cases, the initial image acquisition settings may be inadequate and there may be a delay until a final, more-sufficient parameter settings are adjusted.

A valued usability metric for mark readers is this trigger-to-decode response time, or the time between actuating a trigger to initiate the image decoding process and the reader returning a successful decode response.

BRIEF SUMMARY OF THE INVENTION

The present embodiments overcomes the disadvantages of the prior art by providing improved systems and methods for reducing the trigger-to-decode response time by prioritizing a plurality of images to be decoded based on feature attributes calculated from an image analysis. The feature attributes provide an indication of the likelihood of a successful decode. A reader that can attempt to decode the highest or a higher priority image(s) first and avoid decoding images that are less likely than other images to be successfully decoded. By prioritizing at least some of the images to identify at least one of the images likely to be decodable, the mean time to a successful decode is decreased for a wide range of applications, including variations in the mark, variations of lighting/illumination, and variations in the presentation of the mark, such as orientation and surface characteristics.

Accordingly, some embodiments comprise a mark reader for reading a mark. The reader comprises an image acquisition system that is configured to acquire a plurality of images. An analysis process analyzes at least one acquired image to determine feature attributes of the at least one acquired image. A rating process then uses the feature attributes of the at least one acquired image to provide a priority for the at least one acquired image based on the likelihood that each acquired image will result in a successful decode. Once prioritized, a decode process attempts to decode one or more of the plurality of images based on the priority of at least one of the acquired images.

Other embodiments also comprise a mark reader. The mark reader comprises an image acquisition system that is configured to acquire at least a first image and a second image. An analysis process analyzes at least the first image and the second image to determine feature attributes of the first image and the second image. A rating process uses the feature attributes of the first image to prioritize the first image based on the likelihood that the first image will result in a successful decode, and the rating process uses the feature attributes of the second image to prioritize the second image based on the likelihood that the second image will result in a successful decode, the rating process resulting in at least one priority image. A decode process then attempts to decode the at least one priority image.

Consistent with the above, some embodiments include a method for decoding a mark. The method comprises a variety of steps including: acquiring a plurality of images using an image acquisition system; analyzing at least one acquired image to determine feature attributes of the at least one acquired image; assigning a priority to the at least one acquired image based on the feature attributes determined for the at least one acquired image, the feature attributes providing an indication of the likelihood that the at least one acquired image will result in a successful decode; and attempting to decode at least one of the plurality of images with an assigned priority.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
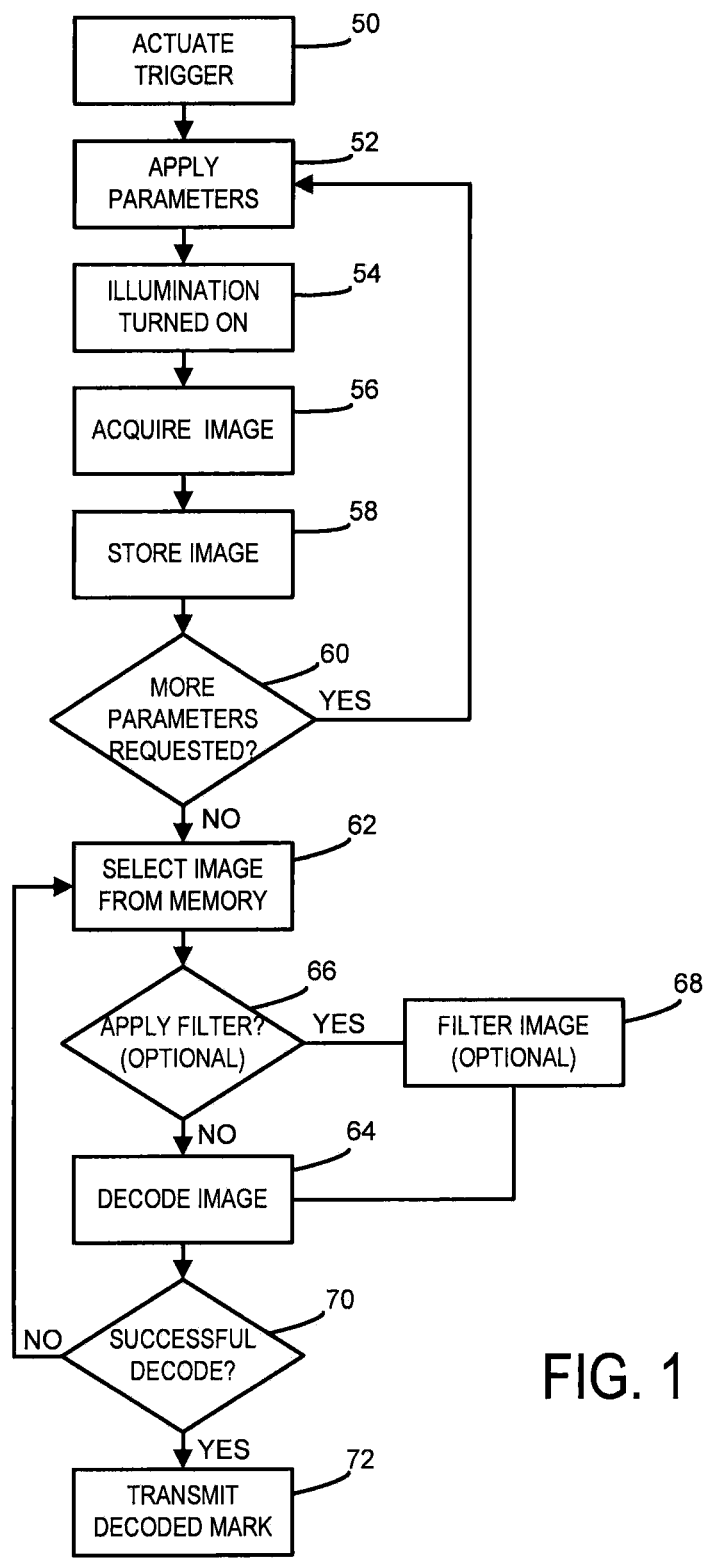
FIG. 1 is a flowchart illustrating a method wherein a reader cycles through a known image decoding process.
Figure 2:
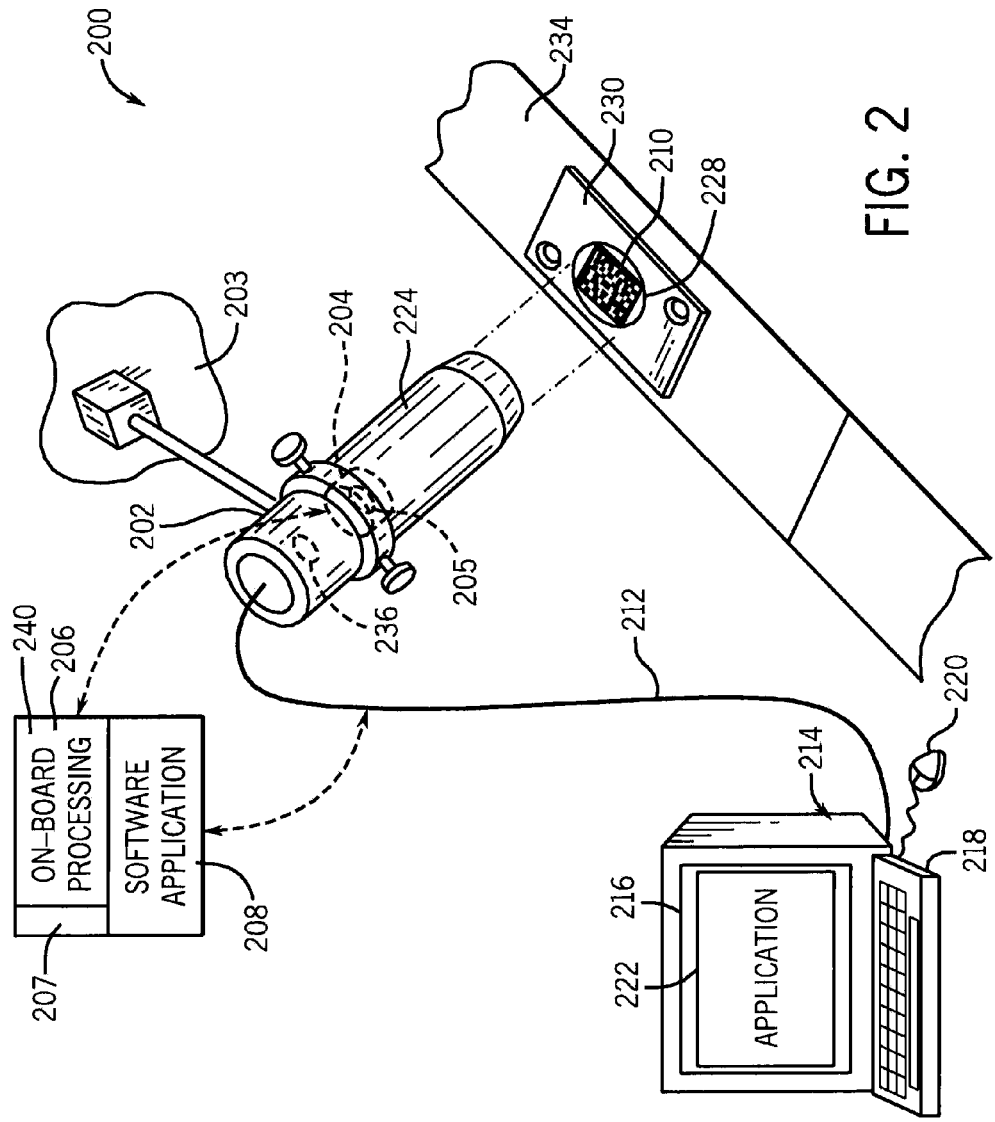
FIG. 2 is a perspective view of a fixed mount reader constructed in accordance with embodiments of the present invention.

Referring to the drawings wherein like reference numerals correspond to similar elements throughout the views, and more specifically, referring to FIG. 2, the present embodiments are described in the context of an exemplary fixed mount mark reader system 200. The exemplary reader is provided with camera element 202 that is a conventional camera mounted on a fixed bracket 203. The camera element includes an image acquisition system 204, including a sensor 205, both shown in phantom, and is controlled to direct image data to a remote or an onboard embedded processor 206. This processor includes a software application 208 by which illumination is controlled, images are acquired and image data is interpreted into usable information derived from the marks (such as the depicted two-dimensional mark 210). Usable information includes, for example, alphanumeric strings, binary data, and binary data along with interpretation information, such as a flag to indicate the binary data is Kanji character data. The decoded information is directed via a cable 212 or wireless link to a PC or other data storage and/or processing device 214 (e.g., computer, programmable logic controller) having, for example, a display 216, keyboard 218, and mouse 220, wherein some embodiments it is stored and further manipulated using an appropriate application 222. Other information such as decode success or decode failure may be transmitted by digital signaling on cable 212 or a different cable.

Alternatively, the cable 212 is directly connected to an interface (e.g., a USB port) in the camera element 202 and an appropriate interface in the computer 214, or the cable 212 is replaced with a wireless link. In this case, the computer-based application 222 performs various image interpretation/decoding and illumination control functions as needed. The precise arrangement of the fixed mount system with respect to embedded processors, computers or other processors is highly variable. For example, a wireless interconnect is provided in which no cable 116 is present. Likewise, in some embodiments, the depicted microcomputer is substituted with one or more processing devices, including an onboard processor or a miniaturized processing unit such as a personal digital assistant or other small-scale computing device.

The software application 208 is adapted to respond to inputs from the reader camera element. For example, when a trigger event occurs, such as an instruction from the application 222, illumination source 224 is turned ON, and the internal image sensor 205 (within the image acquisition system 204) acquires an image of a region of interest 228 on an object 230. In some of the embodiments herein, the illumination source is integrated with the camera's standard operating functions, such as strobe and trigger mechanisms, or it is controlled via the software application, for example. Separate control circuitry can also be provided to modulate certain functions of the illumination source.

As seen in FIG. 2, the camera element 202 is viewing parts or an object 230 moving along a conveyer 234. The exemplary region of interest 228 includes a two-dimensional mark 210 (as a non-limiting example) that is used to identify the object 230. Identification and other processing functions are carried out by the software application 208, based upon image data transmitted to the processor 206. An optional visual indicator 236 is illuminated by signals from the processor 206 to indicate a successful read and decode of the mark 210. In some embodiments, audible indicators (not shown) are also activated to indicate associated events.

In some embodiments described herein, the image sensor is a commercially available vision system on-chip (VSOC). A VSOC is a powerful, fully-programmable, autonomous vision system integrated on a chip, and is capable of acquiring and processing images at very high frame rates, and supporting decision-making based on the outcome from such image-processing. Other sensor types are also expressly contemplated, however. For example, in some embodiments the image sensor is a commercially available CMOS or CCD image sensor. Resolution ranges and other sensor types are expressly contemplated.

According to one aspect of the embodiments described herein, the exemplary reader system 200 is configured to reduce the trigger-to-decode time by prioritizing images to be decoded based on the likelihood of a successful decode, and thus decreasing the time to a successful decode. The systems and methods described herein are especially beneficial where the average time to attempt an image decode is greater than the average time to acquire, store, and analyze an image to extract feature attributes.

Figure 3:
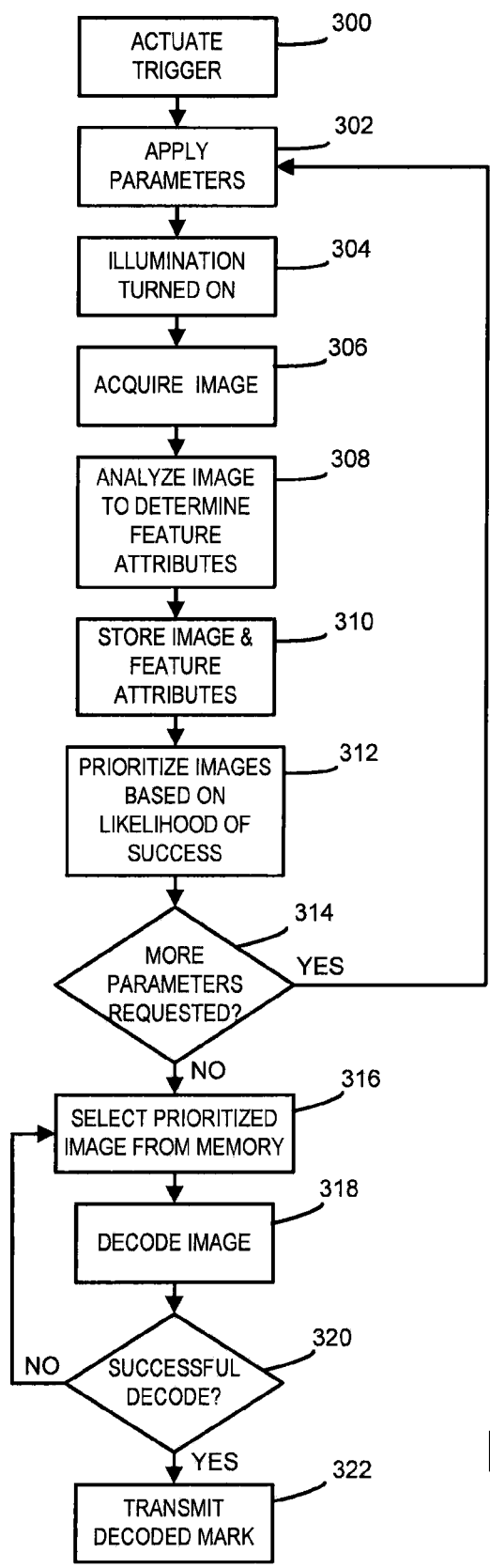
FIG. 3 is a flow chart illustrating an improved method whereby a reader constructed in accordance with embodiments of the present invention cycles through an image decoding process where images are prioritized.

Referring to FIG. 3, an exemplary method of the image decoding process operable with the system 200 is illustrated, with the systems and methods being configured to reduce the trigger-to-decode time. After the reader system 200 is initially turned ON, the image decoding process is initiated, such as by a trigger signal, as indicated at process block 300. The trigger signal is a state change on a digital input line or a communication signal sent to the reader across a communication link, such as an RS-232 or Ethernet link, as non-limiting examples. At this point, the reader may or may not be pointing at the mark to be decoded. The reader then applies the first in a selection of one or more parameter groups to the image acquisition system 204, as indicated at process block 302. Parameter groups include an arrangement of one or more parameters including exposure, gain, focus, illumination selection, illumination control, and filtering, including no filtering, as non-limiting examples. After the parameters are applied, the illumination source 224 on or within the reader is turned ON at process block 304 to illuminate the mark to be decoded. Illumination, either external or ambient illumination and/or illumination from the reader, reflects off of the intended mark and back to the reader and onto, i.e., to expose, the sensor 205 in the image acquisition system 204 within the reader to acquire an image of the mark, as indicated at process block 306.

Use of a dual processor architecture is well suited for this method. For example, use of a VSOC as described above for the image acquisition system 204, in addition to the processor describe above (e.g., processor 206), provides for improved trigger-to-decode performance. In some embodiments, the processor 206 is a digital signal processor (DSP). The VSOC architecture allows for full 1024 times 752 pixels, for example, to be transferred to the DSP 206 in about 9.2 ms, where known decoding methods can take between 50-500 ms, for example. Additionally, the VSOC architecture allows for some image processing that is done in parallel with image data transfer and DSP processing (e.g., image decoding) so the feature attribute analysis time impact is minimal. The VSOC is also capable of transferring to memory 207 one or more post-filtered images in addition to or in substitution of one or more pre-filtered images.

Figure 4:
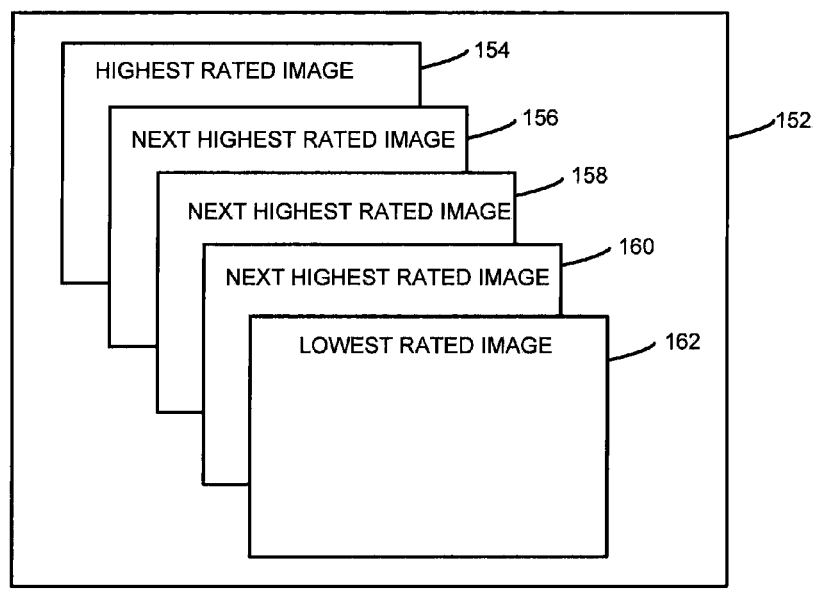
FIGS. 4 and 5 are representations of prioritized images usable with the embodiments of the invention.

In one embodiment, when a VSOC is used for the image acquisition system, the VSOC 204 allows for the execution of a predetermined algorithm on the image to analyze the image to determine image feature attributes, as indicated at process block 308. Because of the processing capability of the VSOC, in some embodiments, this analysis takes place before the image (and feature attributes) are stored to memory, as indicated at process block 310. The feature attributes of the image provide an indication of the likelihood that the image will result in a successful decode. Feature attributes include contrast, sharpness, edge definition, size, shape, and orientation, as non-limiting examples. The image is then prioritized based on its feature attributes, and the prioritized image is arranged into a prioritized image list 152 (see FIG. 4), as indicated at process block 312.

Figure 5:
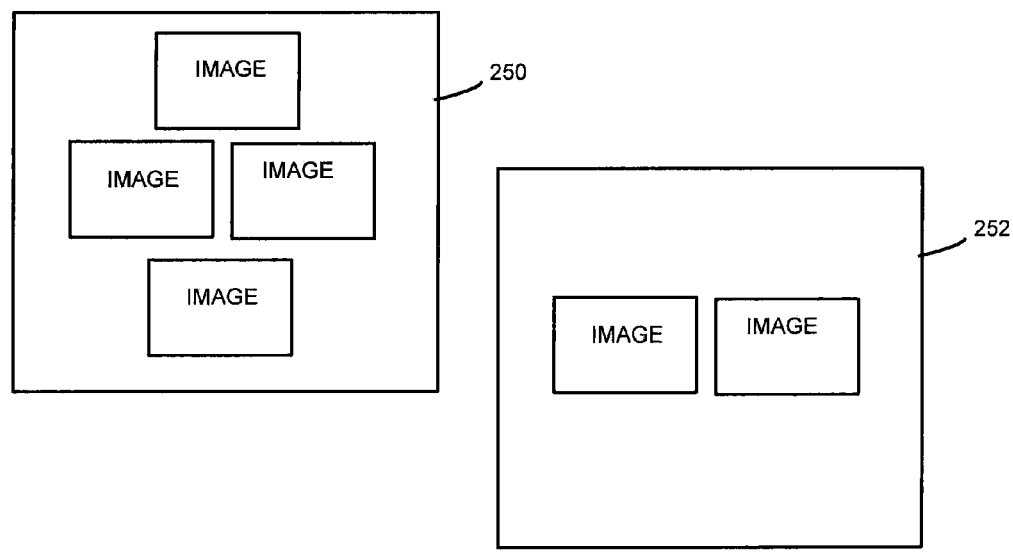

Other prioritization schemes are also contemplated, including not prioritizing all the acquired images. In some embodiments, the acquired images are not prioritized because of some other event, such as a timeout, a first image decode, or for optimization. In other embodiments, the images are prioritized into one or more groups, as compared to a prioritized list. For example, in one embodiment shown in FIG. 5, the acquired images are prioritized into a priority group 250 and a non-priority group 252, and one or more images would be selected from the priority group before one or more images are selected from the non-priority group. In addition, images from the non-priority group need not ever be selected. An image other than the highest priority image or from the priority group may also be chosen, depending on the application.

In an alternative embodiment, when a CMOS or CCD image sensor 205 is used, processor 206, or an additional processor 240, performs the analysis of the acquired image to determine image feature attributes. The software application for processor 206 need not be the same application running for processor 240. In this embodiment, once the image is acquired, as indicated at process block 306, the image is analyzed to determine feature attributes, as indicated at process block 308. The calculated feature attributes are then used to prioritize the image, as indicated at process block 312.

If the reader is configured to acquire one or more additional images, a new parameter group is applied to the acquisition system and the process repeats at process block 302 to acquire, analyze, store and prioritize additional images for the prioritized image list 152. In some variations, the reader is configured to acquire an image using a parameter group one time, or more than one time, or continuously.

One or more image feature attributes are used to produce a metric that provides an indication of the relative likelihood of a successful decode. The images are rated such that a higher priority image or the highest priority image is selected first for decoding. For example, the image with the highest relative likelihood of a successful decode is the highest rated image 154 on the list, and the image with the next highest relative likelihood is rated next highest 156 on the list, and so on, as indicated with images 158 and 160, until the image with the lowest relative likelihood of a successful decode is determined as the lowest rated image 158.

Once the first acquired image (and possibly feature attributes) has been stored to memory, the second processor 206, selects the first acquired image, or if not the first image, a higher priority image or the highest priority image, from the prioritized image list in memory and executes a predetermined algorithm on the stored image data in an attempt to decode the image data, as indicated at process blocks 316 and 318. As described above, a feature of the methods described herein allows the second processor 206 to attempt to decode the first image, or a higher priority image, in parallel with the VSOC 204 while the VSOC is acquiring, analyzing, storing, and prioritizing images for the second processor to use in attempts to decode.

For example, image 154 is selected from the prioritized image list 152 for decoding, as indicated at process block 316. This first image 154 is taken from the top of the prioritized image list, i.e., the image has the highest relative likelihood of a successful decode and is the highest rated image on the list 152. If the image data is acceptable, this highest rated image 154 is decoded or analyzed for the presence of a mark, as indicated at process block 318.

Next, as indicated at decision block 320, if the decoding step 318 does not result in a decoded image, the process moves back to process block 316 and selects another higher priority image, such as the next highest rated image 156 from the prioritized image list for decoding, i.e., the process selects the second image 156 from the list, the image having the second highest relative likelihood of a successful decode compared to the highest rated image 154. This process is repeated for as many images as there are on the prioritized image list 152, or for as many times as required to decode the image, or until the user releases the trigger, or until a timeout condition occurs, for example. As described above, in one embodiment, while processor 206 is selecting prioritized images from memory and attempting to decode, in parallel, the VSOC is acquiring, analyzing, storing, and prioritizing additional images in the prioritized image list 154 for the second processor to use in attempts to decode.

It is to be appreciated that "in parallel" may define a process that is truly in parallel if hardware supported, such as with multiple processors or a multi-core processor, or in parallel may define a process that is interleaved with another process, where only one processor is executing both processes.

When the mark is found and successfully decoded, the reader typically will transmit/indicate the decoded data from the mark by outputting the decoded data, and/or actuating some form of user feedback such as a beeper and/or status lights, and/or digital signaling, as indicated at process block 322. At this point, the reader 200 is configured to return to process block 300 to await the next trigger event.

Figure 6:
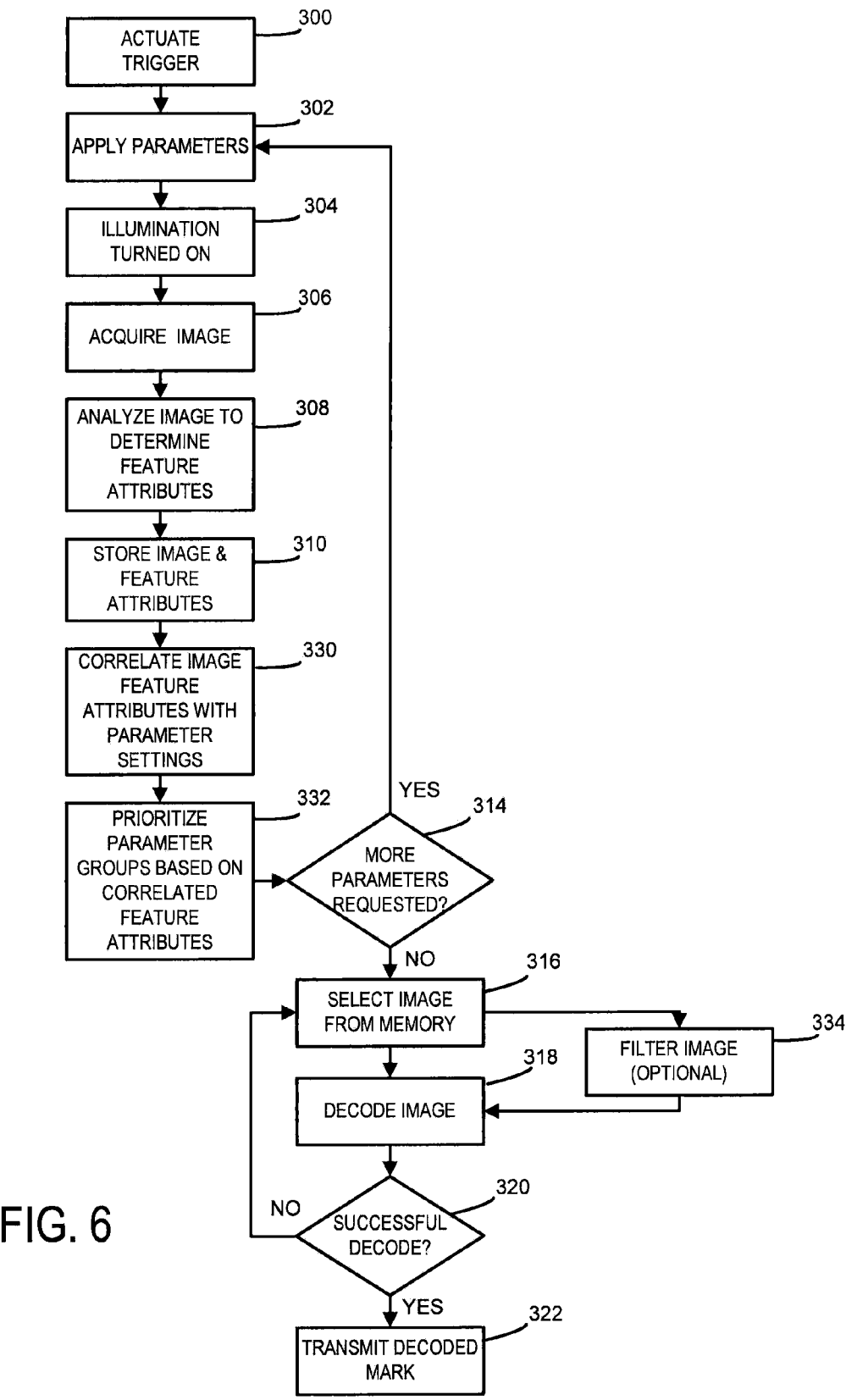
FIG. 6 is a flow chart illustrating an additional optional method usable with embodiments of the invention.

According to another aspect of the embodiments, not only are the feature attributes prioritized as shown in FIG. 3, but the feature attributes are also correlated with the parameter group used with each acquired image, as shown in FIG. 6. Similar to the systems and methods of FIG. 3, after the system 200 is initially turned ON, the image decoding process is initiated by a trigger signal, as indicated at process block 300. At this point, the reader may or may not be pointing at the mark to be decoded. The reader then applies the first in a selection of one or more parameter groups to the image acquisition system 204, as indicated at process block 302. After the parameters are applied, the illumination source 224 on or within the reader is turned ON at process block 304 to illuminate the mark to be decoded. Illumination, either external or ambient illumination and/or illumination from the reader, reflects off of the intended mark and back to the reader and onto, i.e., to expose, the VSOC when used as the image acquisition system 204, to acquire an image of the mark as indicated at process block 306.

Once the images are acquired as indicated at process block 306, VSOC 204 allows for the execution of an algorithm on the image to analyze the image to determine image feature attributes, as indicated at process block 308. As previously described, the processing capability of the VSOC allows this analysis to place before the image (and feature attributes) are stored to memory, as indicated at process block 310.

Figure 7:
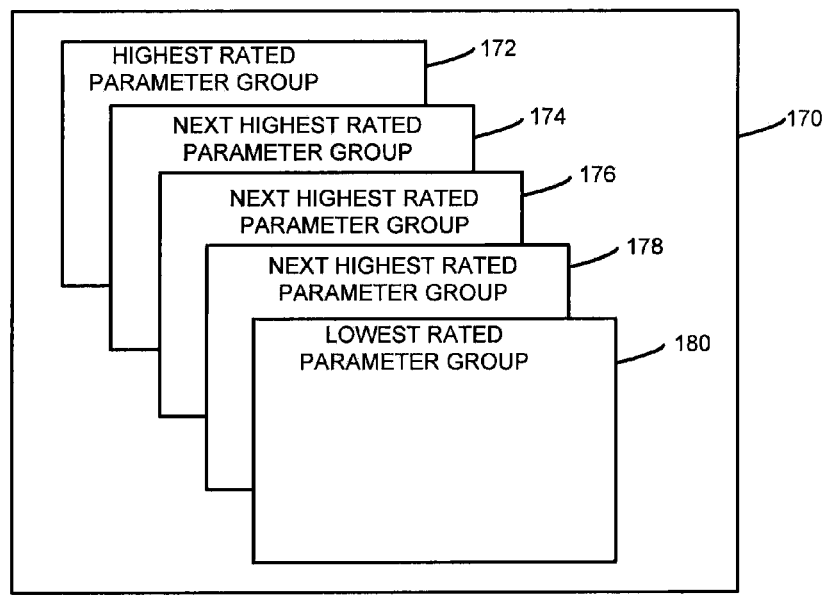
FIGS. 7 and 8 are representations of prioritized parameter groups usable with the embodiments of the invention.

The feature attributes of the image provide an indication of the likelihood that the image will result in a successful decode. In an illustrative embodiment, the feature attributes of some or all of the images are correlated with parts of all of the parameter group used for the image, as indicated at process block 330. Based on the correlation, the parameter group is also prioritized in a parameter group list 170 (see FIG. 7), as indicated at process block 332. The parameter group that was used with an image and produced the highest relative likelihood of a successful decode based on the determined feature attributes is the highest rated parameter group 172 on the list, and the parameter group used with the image with the next highest relative likelihood of a successful decode is rated the next highest parameter group 174 on the list, and so on, as indicated with parameter groups 176 and 178, until the parameter group used with the image with the lowest relative likelihood of a successful decode is rated the lowest parameter group 180. The parameter groups in the prioritized parameter group list 170 is then used to determine the parameter group for subsequent image acquisition. A parameter group other than the highest parameter group can be chosen, depending on the application.

Figure 8:
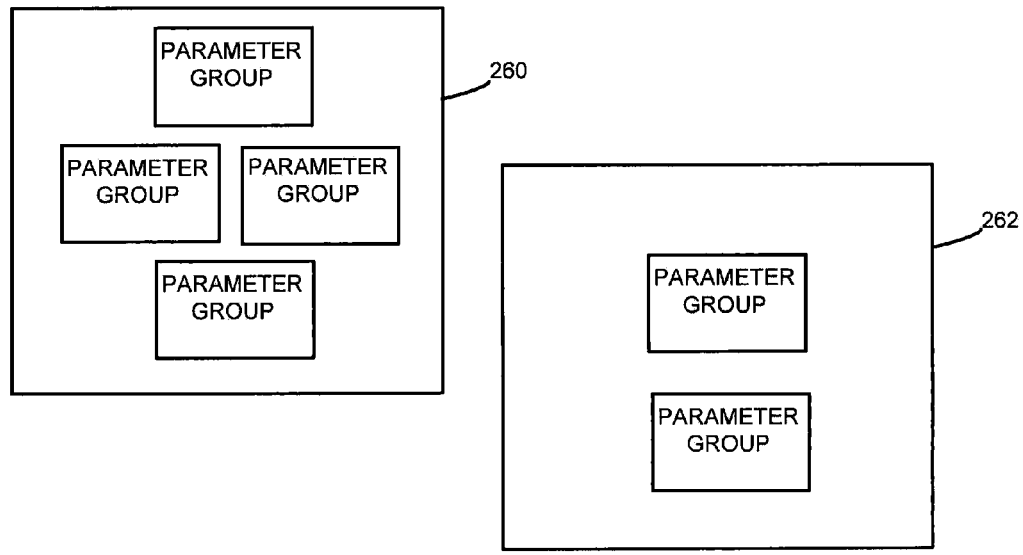

In other embodiments, the parameter groups are prioritized into one or more groups, as compared to a prioritized parameter group list. For example, in one embodiment shown in FIG. 8, the parameter groups are prioritized into a priority parameter grouping 260 and a non-priority parameter grouping 262, and one or more parameter groups would be selected from the priority parameter grouping before one or more parameter groups are selected from the non-priority parameter grouping. In addition, parameter groups from the non-priority parameter grouping need not ever be selected. A parameter group other than the highest priority parameter group or from the priority parameter grouping may also be chosen, depending on the application.

If the reader is configured to acquire one or more additional images, a new parameter group is applied to the acquisition system and the process repeats at process block 302 to acquire, analyze, and store additional images. In one embodiment, the process moves to process block 302 to acquire the next image using the parameter group from the prioritized parameter group list 170. The parameter group is taken from the prioritized parameter group list, e.g., the parameter settings that produced the highest relative likelihood of a successful decode is placed on the top of the list, i.e., the highest rated parameter setting 172, and is used for acquiring the next image or images. It is to be appreciated that in some embodiments the parameter group is changed on a frame-by-frame basis using a parameter group from the parameter group list, or for example, a parameter group is used for each image acquired in a sequence of images. In some variations, the reader is configured to acquire an image using a parameter group one time, or more than one time, or continuously.

Once the first available image (and possibly feature attributes) has been stored to memory, the second processor 206, selects the first available image, or if not the first available image, another available image, for example, from memory and executes a predetermined algorithm on the stored image data in an attempt to decode the image data, as indicated at process blocks 316 and 318. As described above, a feature of the methods described herein allows the second processor 206 to attempt to decode the first image, or if not the first image, the next or another available image, in parallel with the VSOC 204 while the VSOC is acquiring, analyzing, and storing images for the second processor to use in attempts to decode.

Next, as indicated at decision block 320, if the decoding step does not result in a decoded image, the process moves back to process block 316 and selects the next available or another available image from memory 207 for decoding. This process is repeated for as many images as there are in memory, or for as many times as required to decode the image, or until the user releases the trigger, or until a timeout condition occurs, for example.

When the mark is found and successfully decoded, the reader typically will transmit/indicate the decoded data from the mark by outputting the decoded data, and/or actuating some form of user feedback such as a beeper and/or status lights, as indicated at process block 322. At this point, the reader 200 is configured to return to process block 300 to await the next trigger event.

Figure 9:
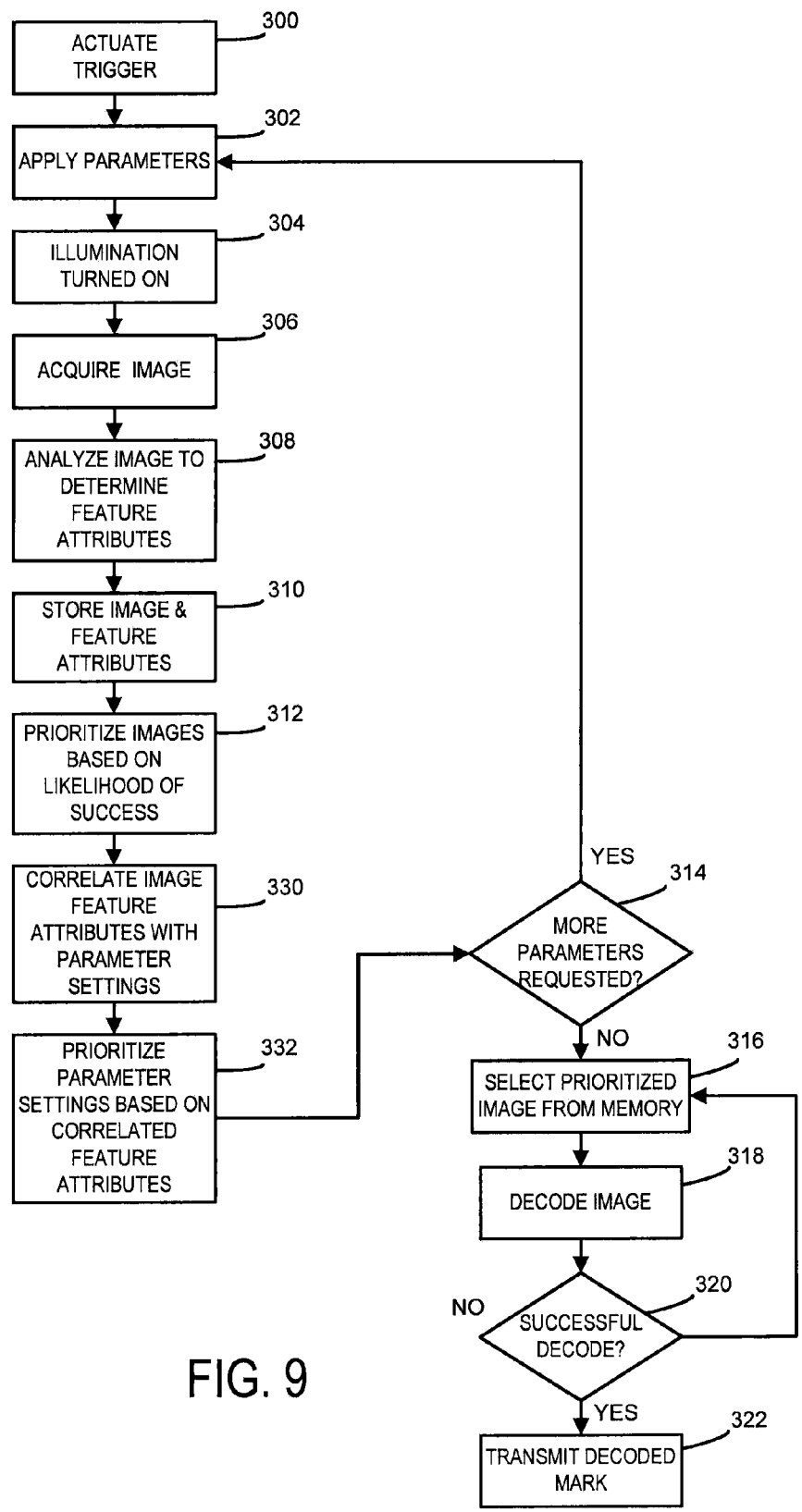
FIG. 9 is a flow chart illustrating an additional optional method usable with embodiments of the invention.

According to another aspect of the embodiments, the features of the systems and methods described in FIG. 3 are combined in whole or in part with the features of the systems and methods described in FIG. 6. In this way, not only are the images prioritized based on the feature attributes that may lead to a likelihood of a successful decode, the feature attributes identified in one or more image are further correlated with the parameter group used with the image to prioritize the parameter group for use in future image acquisitions, as shown in FIG. 9. Similar to the systems and methods of FIGS. 3 and 6, after the system 200 is initially turned ON, the image decoding process is initiated by a trigger signal, as indicated at process block 300. At this point, the reader may or may not be pointing at the mark to be decoded. The reader then applies the first in a selection of one or more parameter groups to the image acquisition system 204, as indicated at process block 302. After the parameters are applied, the illumination source 224 on or within the reader is turned ON at process block 304 to illuminate the mark to be decoded. Illumination, either external or ambient illumination and/or illumination from the reader, reflects off of the intended mark and back to the reader and onto, i.e., to expose, the VSOC when used as the image acquisition system 204, to acquire an image of the mark as indicated at process block 306.

Once the image is acquired as indicated at process block 306, the VSOC 204 executes a predetermined algorithm on the image data to analyze the image to determine image feature attributes, as indicated at process block 308. As previously described, the processing capability of the VSOC allows this analysis to place before the image (and feature attributes) are stored to memory, as indicated at process block 310. The feature attributes of the image provide an indication of the likelihood that the image will result in a successful decode. Feature attributes include contrast, sharpness, edge definition, size, shape, and orientation, as non-limiting examples. As indicated at process block 312, the image is then prioritized based on its feature attributes, and the prioritized image is arranged into a prioritized image list 152 (see FIG. 4).

In an alternative embodiment, when a CMOS or CCD image sensor 205 is used, a processor in addition to processor 206 is included to perform the analysis of the acquired image to determine image feature attributes. In this embodiment, once the image is acquired, as indicated at process block 306, the image is first stored in memory prior to analyzing the image to determine feature attributes. Once stored, the additional processor then analyzes the image to determine feature attributes, and then stores to memory the calculated feature attributes associated with the image.

The image feature attributes are combined into a metric that provides an indication of the relative likelihood of a successful decode. It is also contemplated that only one feature attribute influences the metric. The images are rated such that a higher priority image or the highest priority image is selected first for decoding. For example, the image with the highest relative likelihood of a successful decode is the highest rated image 154 on the list, and the image with the next highest relative likelihood is rated next highest 156 on the list, and so on, as indicated with images 158 and 160, until the image with the lowest relative likelihood of a successful decode is determined as the lowest rated image 158.

The feature attributes of each individual image are then correlated with the parameter group used for the image, as indicated at process block 330. Based on the correlation, the parameter group is also prioritized in a parameter group list 170 (see FIG. 7), as indicated at process block 332. The parameter group that was used with an image and produced the highest relative likelihood of a successful decode based on the determined feature attributes is the highest rated parameter group 172 on the list, and the parameter group used with the image with the next highest relative likelihood of a successful decode is rated the next highest parameter group 174 on the list, and so on, as indicated with parameter groups 176 and 178, until the parameter group used with the image with the lowest relative likelihood of a successful decode is rated the lowest parameter group 180. The parameter groups in the prioritized parameter group list 170 then used to determine a parameter group for subsequent image acquisition. If the reader is configured to acquire one or more additional images, a new parameter group is applied to the acquisition system and the process repeats at process block 302 to acquire, analyze, and store additional images. In one embodiment, the process moves to process block 302 to acquire the next image using the parameter group from the prioritized parameter group list 170. A prioritized parameter group is taken from the prioritized parameter group list, e.g., a higher priority parameter group or the highest priority parameter group is used. It is to be appreciated that in some embodiments the parameter group is changed on a frame-by-frame basis using a parameter group from the parameter group list, or for example, a parameter group is used for each image acquired in a sequence of images. In some variations, the reader is configured to acquire an image using a parameter group one time, or more than one time, or continuously.

Once the first image (and possibly feature attributes) has been stored to memory, the second processor 206, selects the first acquired image, or if not the first image, a higher priority image or the highest priority image, from the prioritized image list in memory and executes a predetermined algorithm on the stored image data in an attempt to decode the image data, as indicated at process blocks 316 and 318. As described above, a feature of the methods described herein allows the second processor 206 to attempt to decode the first image, or if not the first image, a higher priority image or the highest priority image, in parallel with the VSOC 204 while the VSOC is acquiring, analyzing, storing, and prioritizing images for the second processor to use in attempts to decode.

For example, image 154 is selected from the prioritized image list 152 for decoding, as indicated at process block 316. This first image 154 is taken from the top of the prioritized image list, i.e., the image has the highest relative likelihood of a successful decode and is the highest rated image on the list 152. If the image data is acceptable, this highest rated image 154 is decoded or analyzed for the presence of a mark, as indicated at process block 318.

Next, as indicated at decision block 320, if the decoding step 318 does not result in a decoded image, the process moves back to process block 316 and selects another higher priority image, such as the next highest rated image 156 from the prioritized image list for decoding, i.e., the process selects the second image 156 from the list, the image having the second highest relative likelihood of a successful decode compared to the highest rated image 154. This process is repeated for as many images as there are on the prioritized image list 152, or for as many times as required to decode the image, or until the user releases the trigger, or until a timeout condition occurs, for example. As described above, while processor 206 is selecting prioritized images from memory and attempting to decode, in parallel, the VSOC is acquiring, analyzing, storing, and prioritizing additional images in the prioritized image list 154 for the second processor to use in attempts to decode.

When the mark is found and successfully decoded, the reader typically will transmit/indicate the decoded data from the mark by outputting the decoded data, and/or actuating some form of user feedback such as a beeper and/or status lights, as indicated at process block 322. At this point, the reader 200 is configured to return to process block 300 to await the next trigger event.

In various embodiments described herein, one of the parameter group settings applied at process block 302 is a focal setting for an adjustable component, such as a lens or a mirror in the optical path. In one or more embodiments, a variable lens element is used, known as a liquid lens. The liquid lens is an optical device that changes focus position based on an applied voltage to a fluid or gel bounded by a flexible polymer, which changes the shape of the lens. Lens response times are typically 20-50 ms. When combined with standard lenses, the liquid lens can focus from device contact to infinity.

Other focal configurations are contemplated as well. For example, a lens or lenses is incorporated where movement of the lens or lenses is accomplished using small motors and/or voice coils and/or piezoelectric systems. In some embodiments, other variable lens elements are also used, for example, by changing the refractive index of a transparent material.

In various embodiments as described herein, it should be understood that the type of data that is read and captured by the image sensor 132 is not limited to bar codes or other such symbols. In the various embodiments described herein, unless otherwise specified, any type of symbols, characters, or pictures (e.g., driver's license photos), or other data may be captured by the image acquisition system 204. In addition, in some embodiments, the image acquisition system 204 comprises a smart sensor, such as vision system on a chip (VSOC), that is capable of providing raw or filtered data, along with image feature data, to a secondary processor, such as processor 206. Where such data is amenable to decoding, the processor 206 of the reader 200 decodes it; alternatively, the data is passed along for processing by an inspection system, an optical character recognition system, a host system, or stored locally or remotely for later read-out.

In additional various embodiments, the reader 200 is configured to perform image filtering operations on the image prior to decoding, as indicated at process block 334 in FIG. 6, for example. This image filtering is performed by the processor 206, or it is performed by hardware (e.g., the VSOC 204) prior to storing the image to memory. Images are considered pre-filtered, including un-filtered, or post-filtered. Feature attributes calculated from one or more images may be used to prioritize pre-filtered images, post-filtered images, or a collection of both. In one embodiment, post-filtered images are prioritized for decoding based on feature attributes from one or more pre-filtered images, such that a post-filtered image need not be created. This configuration avoids processing time spent in filtering images.

It is to be appreciated that in some embodiments the filtering is considered part of the decode processing itself, but when considered as a separate pre-processing step, the filtering is designed to transform the image in a manner such that further decode processing is easier, (e.g., such as a contrast enhancement to enhance the mark features, or image smoothing to suppress background texture). The choice of filtering is typically predetermined, although in some embodiments it is part of the selected parameter group.

As previously described, in some embodiments, the VSOC is capable of performing some image processing operations and may transfer to memory one or more post-filtered images in addition to or in substitute of the pre-filtered image.

It should be noted that the various embodiments described herein, including rating images based on feature attributes, prioritizing images, correlating feature attributes with parameter groups, prioritizing parameter groups, image filtering, and the like, may each be used independently or in various combinations with one another, and is user selectable or non-selectable features. In addition, in some embodiments, prioritization of images and/or parameter groups is based on the most recent decode attempt, or the prioritization is based on a combined determination of more than just the last decode, such that the results of more than one decode attempt are used for prioritization, for example. It is also contemplated that an image is decoded with one parameter group and also additional image(s) are acquired using prioritized parameter group(s) and decoded. When the scene observed by the camera does not change substantially, this may result in more than one decode attempt of the same mark.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

Thus, the invention is to cover all modifications, equivalents, and alternatives falling within the spirit and scope of the invention as defined by the following appended claims. As such, the following claims are made:

What is claimed is:

1. A mark reader comprising:
an image acquisition system, the image acquisition system configured to acquire a plurality of images;

an analysis process that analyzes at least one acquired image to determine feature attributes of the at least one acquired image;

a rating process that uses the feature attributes of the at least one acquired image to provide a priority for the at least one acquired image based on the likelihood that the at least one acquired image will result in a successful decode; and a decode process that attempts to decode one or more of the plurality of images based on the priority of at least one of the acquired images.

2. The reader according to claim 1 wherein a first processor is configured to perform at least one of the analysis process and the rating process, and a second processor is configured to perform the decode process.

3. The reader according to claim 1 further including a memory capable of storing images; and
wherein the at least one acquired image is stored in the memory prior to the analysis process.

4. The reader according to claim 1 further including a memory capable of storing images; and
wherein the at least one acquired image is stored in the memory after the analysis process and before the decode process.

5. The reader according to claim 1 wherein a parameter group is applied to the image acquisition system prior to acquiring the plurality of images.

6. The reader according to claim 1 wherein a parameter group is applied to the image acquisition system prior to acquiring at least one of the plurality of images.

7. The reader according to claim 6 wherein the feature attributes of the at least one acquired image are correlated with the parameter group used for the at least one acquired image.

8. The reader according to claim 7 wherein at least one parameter group used for the at least one acquired image is prioritized based on the correlation of the at least one parameter group with the feature attributes of the at least one acquired image.

9. The reader according to claim 8 wherein subsequent images are acquired using prioritized parameter groups.

10. A mark reader for reading marks, the reader comprising:

an image acquisition system, the image acquisition system configured to acquire at least a first image and a second image;

an analysis process that analyzes at least the first image and the second image to determine feature attributes of the first image and the second image;

a rating process that uses the feature attributes of the first image to prioritize the first image based on the likelihood that the first image will result in a successful decode, and the rating process uses the feature attributes of the second image to prioritize the second image based on the likelihood that the second image will result in a successful decode, the rating process resulting in at least one priority image; and a decode process that attempts to decode the at least one priority image.

11. The reader according to claim 10 further including a memory capable of storing a prioritized image list; and
wherein the decode process selects the at least one priority image from the prioritized image list.

12. The reader according to claim 10 wherein an average time to attempt the decode process is greater than an average time to acquire and analyze at least one of the first image and second image.

13. A method for decoding a mark, the method comprising:
acquiring a plurality of images using an image acquisition system;
analyzing at least one acquired image to determine feature attributes of the at least one acquired image;
assigning a priority to the at least one acquired image based on the feature attributes determined for the at least one acquired image, the feature attributes providing an indication of the likelihood that the at least one acquired image will result in a successful decode; and
attempting to decode at least one of the plurality of images with an assigned priority.

14. The method according to claim 13 wherein attempting to decode the at least one of the plurality of images with the assigned priority takes place in parallel with analyzing another one of the plurality of images.

15. The method according to claim 13 further including applying a parameter group to the image acquisition system prior to acquiring the plurality of images; and
correlating the feature attributes of at least one of the plurality of images with the parameter group used for the at least one of the plurality of images.

16. The method according to claim 15 wherein the parameter group includes a focal setting for a liquid lens.

17. The method according to claim 15 wherein the parameter group used for the at least one of the plurality of images is prioritized into a prioritized parameter group list based on the correlating.

18. The method according to claim 17 wherein at least one subsequent image is acquired using a prioritized parameter group from the prioritized parameter group list.

19. The method according to claim 13 further including filtering at least one of the plurality of images prior to attempting to decode.

20. The method according to claim 13 wherein a first processor is configured to perform at least one of the analyzing and assigning, and a second processor is configured to perform the attempting to decode.

* * * * *